A. ROSENTHAL.
CENTRIFUGAL CLUTCH.
APPLICATION FILED NOV. 6, 1913.
1,169,871.
Patented Feb. 1, 1916.
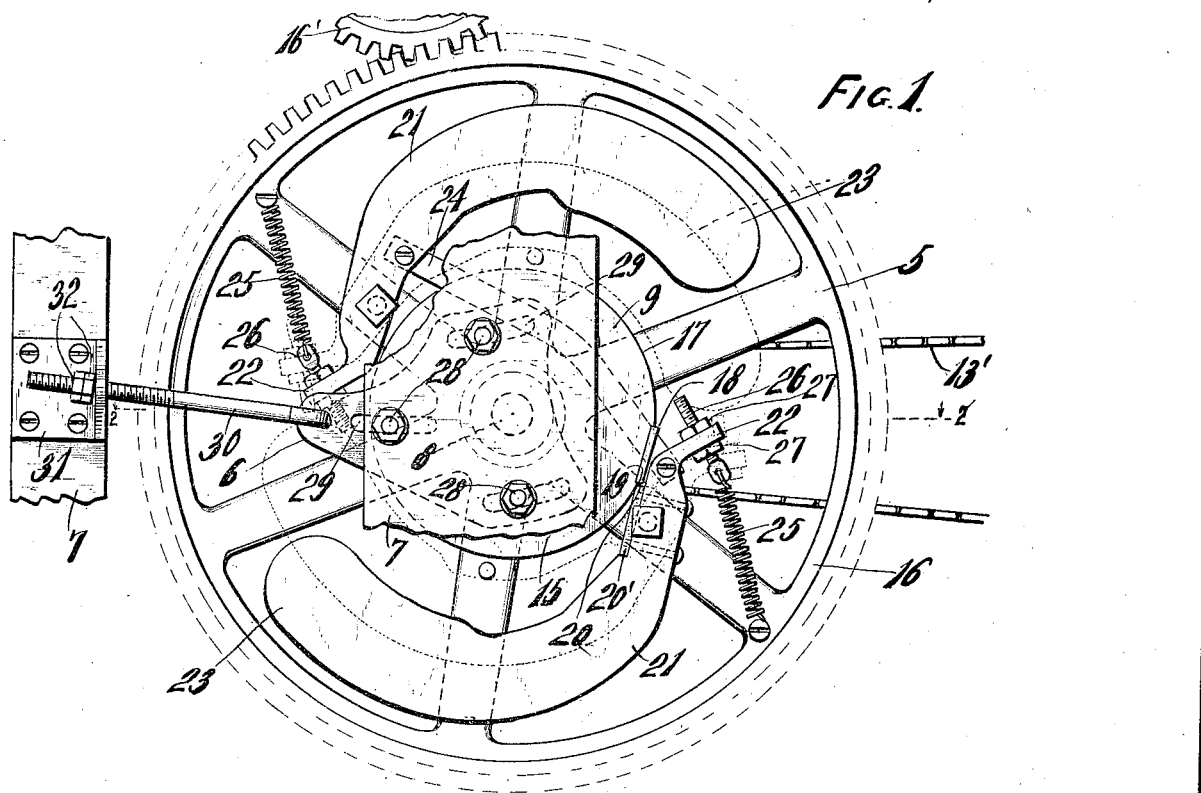
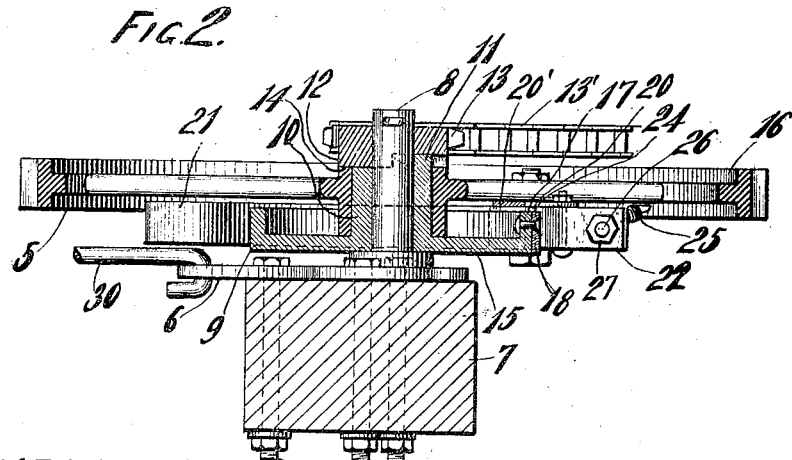
WITNESSES.
INVENTOR.
August Rosenthal,
By Morsell & Caldwell
ATTORNEYS.

UNITED STATES PATENT OFFICE.

AUGUST ROSENTHAL, OF WEST ALLIS, WISCONSIN.

CENTRIFUGAL CLUTCH.

1,169,871.  Specification of Letters Patent.  Patented Feb. 1, 1916.

Application filed November 6, 1913. Serial No. 799,418.

*To all whom it may concern:*

Be it known that I, AUGUST ROSENTHAL, a citizen of the United States, and resident of West Allis, in the county of West Allis and State of Wisconsin, have invented new and useful Improvements in Centrifugal Clutches, of which the following is a description, reference being had to the accompanying drawings, which are a part of this specification.

This invention relates to improvements in centrifugal clutches.

In feed cutting machines of various kinds it has been found that unless the rotary parts are revolved at predetermined speeds that the continued excess feed of material will have a tendency to retard the rotation of the cutter and if the feed is not reduced to permit the cutter to come to normal speed the cutter will slow down and stop. This trouble is also apparent in other classes of machines for moving or acting upon material.

It is one of the objects of the present invention to overcome the objections before mentioned and provide a centrifugal clutch which will automatically disengage driving connection with the machine of which it forms a part when the rotation decreases below a predetermined speed and to remain disengaged until the speed increases to normal.

A further object of the invention is to provide a centrifugal clutch which will positively connect the driving mechanism with the machine of which it forms a part when the driving mechanism is revolved at its normal rate of speed.

A further object of the invention is to provide a centrifugal clutch which is of simple construction, is strong and durable and is well adapted for the purpose desired.

With the above and other objects in view, the invention consists of the improved centrifugal clutch and its parts and combinations as set forth in the claims, and all equivalents thereof.

In the accompanying drawing in which the same reference characters indicate the same parts in all of the views: Figure 1 is a side view of the improved centrifugal clutch, portions of the frame also being shown; and Fig. 2 is a sectional view thereof taken on line 2—2 of Fig. 1.

Referring to the drawing the numeral 5 indicates the improved centrifugal clutch, 6 the adjustable frame to which it is connected and 7 the main frame of the machine upon which it is mounted. A stud shaft 8 projecting from the adjustable frame has journaled thereon the driven clutch wheel 9 which is provided with an elongated hub 10, and the outer end of this hub is provided with clutch teeth 11 which are engaged by corresponding teeth formed on the hub 12 of a sprocket wheel 13. The sprocket wheel 13 is adapted to have a sprocket chain connection 13' with the mechanism to be driven.

The hub 12 of the sprocket wheel is of larger diameter than the hub 10 to form an annular shoulder 14 therearound and on the elongated hub 10 between this shoulder and the web 15 of the clutch wheel 9 the constantly rotating drive gear wheel 16 of the clutch is journaled. The wheel 16 while shown as a gear may, if desired, be in the form of a belt or other wheel without departing from the spirit and scope of the invention and may be driven in any manner from a source of power.

The flanged periphery 17 of the driven wheel 9 is recessed transversely and a hardened plate 18 extending into the recess and riveted to the flange projects radially therefrom to form a shoulder 19 which is adapted to be engaged by a similar shoulder 20 of the plate 20' mounted on one of the weighted levers 21. The weighted levers are pivoted near one end to the spokes of the driven wheel 16 on diametrically opposite sides of the flanged clutch wheel 9 and in close proximity to the flange of said wheel. The shoulder 20 of the lever is located on the short end 22 of lever and is so positioned with relation to the shoulder 19 as to engage the said shoulder when the weighted end 23 of the lever is swung outwardly by centrifugal force due to rotation of the gear wheel at a predetermined speed. A link 24 connects the two levers together and coiled springs 25 connected at their outer ends to the gear wheel and at their inner ends to threaded bolts 26 which pass through the short ends of the levers, serve to adjust the levers to respond to the speeds at which it is desired to connect and disconnect the drive and driven members rotatively together. Nuts 27 threaded on the bolts on opposite sides of the levers provide for adjusting the tension of the springs.

The frame 6 from which the stud shaft extends is adjustably connected to the main frame by bolts 28 which pass through segmental slots 29 in the adjustable frame to provide for taking up slack in the chain connected to the sprocket wheel. The segmental slots are curved concentrically with the axis of the wheel 16' with which the gear 16 is in mesh to permit the adjustment of the frame without disengaging the intermeshed gear teeth. A threaded rod 30 hooked to the adjustable frame and extending through an angular plate 31 fastened to the main frame has nuts 32 threaded thereon to provide for close adjustment of the frame.

In use if the mechanism to which the sprocket wheel is connected should reduce the speed of rotation of the clutch gear below a predetermined rate the springs would pull the lever shoulder out of engagement with the shoulder of the driven wheel and the driven wheel would come to a stop and relieve the drive or clutch wheel of its load. The drive wheel when relieved of its load will immediately increase in speed and the centrifugal force of the revolving weighted levers will cause them to swing outwardly and when the predetermined speed has been attained the shoulder of one of the arms will be swung inwardly to a position to positively engage the shoulder of the driven wheel and lock and rotate the same as long as the rate of speed remains normal, thus rendering the clutch very desirable for feeding and other mechanisms which have varying loads.

From the foregoing description it will be seen that the clutch is of very simple construction and is positive in its action.

What I claim as my invention is:

1. A centrifugal clutch, comprising a support provided with a projecting shaft, a driven wheel journaled on the shaft and having a peripheral recess, a hardened plate mounted in the recessed portion and projecting therefrom to form a shoulder, a drive wheel of larger diameter than the driven wheel supported by the shaft, a weighted lever pivoted near one end to the side portion of the driven wheel and having a recessed inner edge portion adjacent its short end portion, a hardened plate mounted in the edge recess and projecting therefrom to form a shoulder positioned to engage the shoulder of the driven wheel when the drive wheel is rotated at a predetermined rate of speed and to disengage said shoulder when the rate of speed of said drive wheel is reduced below said rate, and a coiled spring connected to the short end of the lever and to the drive wheel.

2. A centrifugal clutch, comprising a support provided with a projecting fixed shaft, a driven wheel journaled on the shaft and provided with an elongated hub, said wheel also having a peripheral recess, a hardened plate mounted in the recessed portion and projecting therefrom to form a shoulder, a drive wheel journaled on the elongated hub, weighted levers positioned on opposite sides of the shaft and pivoted near one of their end portions to the drive wheel, a link connecting the short end portion of one lever to the long end portion of the other lever, one of said levers at its short end provided with a recess, a hardened plate mounted in the recess and projecting therefrom to form a shoulder positioned to engage the shoulder of the driven wheel when the drive wheel is rotated at a predetermined rate of speed and to disengage said shoulder when the rate of speed of said drive wheel is reduced below said rate, and coiled springs attached to the short ends of the levers and to the drive wheel.

In testimony whereof, I affix my signature, in presence of two witnesses.

AUGUST ROSENTHAL.

Witnesses:
KATHERINE HOLT,
GERTRUDE SCHOLZ.